United States Patent [19]

Fischer et al.

[11] Patent Number: 5,357,263

[45] Date of Patent: Oct. 18, 1994

[54] DISPLAY INSTRUMENT FOR AIRCRAFT FOR SHOWING THE AIRCRAFT ORIENTATION, PARTICULARLY THE ROLLING AND PITCHING POSITION OR THE FLIGHT PATH ANGLE

[75] Inventors: Gerhard Fischer, Immenstaad; Werner Fuchs, Markdorf, both of Fed. Rep. of Germany

[73] Assignee: Dornier Luftfahrt GmbH, Fed. Rep. of Germany

[21] Appl. No.: 854,836

[22] Filed: Mar. 20, 1992

[30] Foreign Application Priority Data

Mar. 20, 1991 [DE] Fed. Rep. of Germany ....... 4109016

[51] Int. Cl.$^5$ ............................................. G09G 3/02
[52] U.S. Cl. .......................................... 345/9; 340/975
[58] Field of Search ............... 340/705, 971, 975, 980; 358/104, 8, 9, 10

[56] References Cited

U.S. PATENT DOCUMENTS

| | | | |
|---|---|---|---|
| 4,283,705 | 8/1981 | James et al. | 340/975 |
| 4,368,517 | 1/1983 | Lovering | 340/972 |
| 4,373,184 | 2/1983 | Lambregts | 340/975 |
| 4,419,079 | 12/1983 | Georges et al. | 358/104 |
| 4,563,742 | 1/1986 | McElreath | 340/975 |
| 4,583,094 | 4/1986 | Mosier | 340/971 |
| 4,626,851 | 12/1986 | Tooze | 340/971 |
| 4,647,967 | 3/1987 | Kirschner et al. | 340/980 |
| 4,786,905 | 11/1988 | Muller | 340/975 |
| 4,903,017 | 2/1990 | Wooller | 340/975 |
| 5,095,746 | 3/1992 | Stanis | 340/975 |
| 5,181,028 | 1/1993 | Sharpe et al. | 340/975 |

*Primary Examiner*—Richard Hjerpe
*Assistant Examiner*—Gin Goon
*Attorney, Agent, or Firm*—Evenson, McKeown, Edwards & Lenahan

[57] ABSTRACT

A display system for aircraft for showing the attitude, particularly the rolling and pitching position or the flight path angle, comprising a windshield projection device (HUD "HEAD-UP DISPLAY") with devices for generating and displaying an airplane symbol, a symbol which is stabilized fixed to earth for the displaying of the position of the true horizon as well as for generating and displaying symbols for the rolling and pitching angle or of the path angle in the exterior field of view of the pilot as a function of the values measured by the corresponding instruments. In this case, a display of the attitude is generated by means of a reference symbol representing the airplane and an information symbol which changes with respect to the reference symbol in its position and shape—and is dependent on the rolling angle ($\phi$) and pitching angle ($\theta$) or path angle ($\gamma$).

8 Claims, 2 Drawing Sheets

DISPLAY INSTRUMENT FOR AIRCRAFT FOR SHOWING THE AIRCRAFT ORIENTATION, PARTICULARLY THE ROLLING AND PITCHING POSITION OR THE FLIGHT PATH ANGLE

BACKGROUND AND SUMMARY OF THE INVENTION

The present invention relates to a display instrument for aircraft for showing the attitude, particularly the rolling and pitching position or the flight path angle, by means of a "HEAD-UP DISPLAY" or a visual display recording unit showing a symbol and a symbol which is stabilized in an earth-fixed manner for showing the true horizon, as well as symbols for displaying the rolling and pitching angle or the flight path angle.

As a result of increasingly higher flying speeds and therefore also higher accelerations during flying maneuvers in the case of civilian airplanes and particularly also airplanes for military use, and because of an increase of the work to be performed by the pilots since flight systems are becoming more complicated, it is necessary to continuously monitor more and more instruments without losing sight of the outside world.

For a relief, so-called "HEAD-UP DISPLAYS" (HUD) are used by means of which the instrument display is superimposed on the view of the air space which the pilot has in front of him.

The information data required for guiding the flight, such as the pitch angle $\theta$, the roll angle $\phi$ and the flight path angle, are recorded in a known manner electronically and are displayed in the form of symbols by means of a cathode ray tube or a correspondingly controlled television system or a noctovision system.

Among the main parts of such systems are a display unit for the pilot; a symbol generator for generating display symbols; and an optical system to project the symbols into the pilots outside field of view symbols into the airplane windshield.

Instrument display values which are important for the guiding of the flight and are to be shown on the "HEAD-UP DISPLAY" are, among others, also those which indicate instrument readings concerning the flight attitude, the compass course or the angle of incidence, by means of numbers or signs, such as dot-type or line-type graduations.

For showing the attitude and for the pilots' spatial orientation, so-called pitch ladders are generally used in all airplanes equipped with "HEAD-UP DISPLAYS" in connection with reference symbols which are stabilized relative to the airplane or relative to the ground. These attitude reference displays are usually moved proportionally to the rolling and pitching speeds of the airplane. However, as the agility of the airplanes increases, it becomes more difficult to interpret such display methods.

It is an object of the invention to improve the attitude orientation for pilots, particularly during highly dynamic flying maneuvers, by means of a stationary representation of the attitude that is easy to interpret while avoiding attitude reference displays which must be moved as a direct function of the airplane pitching or airplane rolling speed.

This object is achieved by providing a display system for aircraft for showing the attitude, particularly the rolling and pitching position or the flight path angle, comprising a windshield projection device (HUD "HEAD-UP DISPLAY") with devices for generating and displaying symbol features representative of the aircraft position in the exterior field of view of the pilot, said symbol features including:

an artificial horizon symbol which is stabilized fixed to earth for displaying the artificial horizon, a rolling angle symbol representing the aircraft rolling angle, and one of a pitching angle symbol representing the aircraft pitching angle and a flight path angle symbol representing the aircraft flight path angle, said symbol features comprising:

an airplane symbol which represents the airplane, and an information symbol having a radial center axis and which changes in size as a function of measured values depending on the rolling position ($\phi$) with respect to its angular position or as a function of the measured values depending on one of the pitching position ($\theta$) and flight path angle position with respect to its course.

A display instrument constructed according to the invention permits the creating of symbols or information symbols, which are fixed in a stabilized manner on the airplane and on the ground and which allows a fast intuitive grasping of the respective flying situation or attitude by the pilot, particularly also in the case of high pitching and rolling speeds. In the normal attitude, the information symbol is situated exactly above the attitude symbol represented as a semicircle segment; or as a result of corresponding control movements of the pilot, the airplane can be intuitively returned by the pilot from an attitude deviating from the normal attitude into the normal attitude while he takes into account the change of the information symbol to a sector shape or ring sector shape of a central angle of 180°.

The system of symbols according to the invention allows, as an alternative to the display of the rolling and pitching angle, also the display of the rolling and flight path angle $\gamma$. In the case of the display of the flight path angle, the segment length (center angle) amounts to 180°−2·the flight path angle $\gamma$ (180°−2$\gamma$).

Other objects, advantages and novel features of the present invention will become apparent from the following detailed description of the invention when considered in conjunction with the accompanying drawings.

DETAILED DESCRIPTION OF THE DRAWINGS

Figure 1:
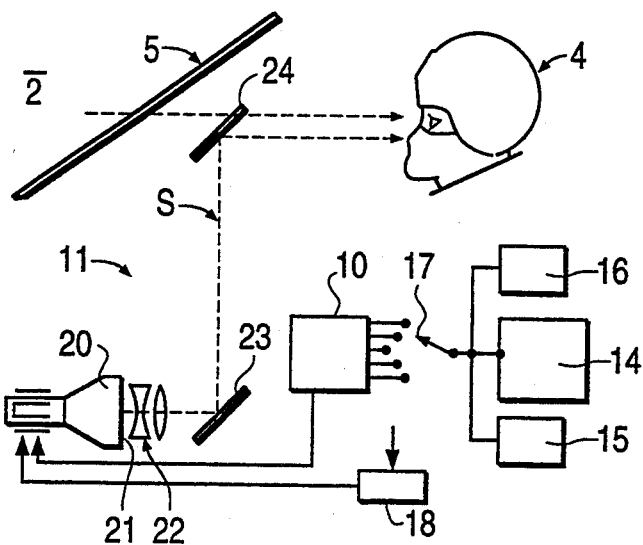
FIG. 1 is a schematic representation of the overall structure of a windshield projection device (HEAD-UP DISPLAY) of a known construction.

The windshield projection device illustrated in FIG. 1 is provided for showing particularly flight information for airplanes in flight. The display takes place in a generally known manner in the area of the windshield of the airplane within the pilot's outside field of view.

Situation information is displayed here of the values received by measuring devices concerning the pitching position $\theta$, the rolling position $\phi$, the azimuth or true-bearing angle, the flying speed and the flight altitude.

Figure 2:
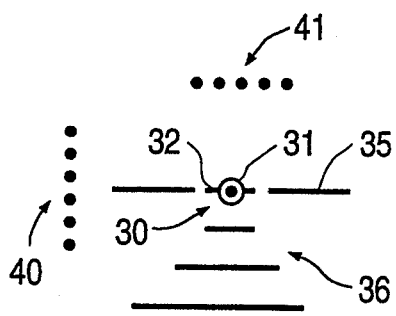
FIG. 2 is a schematic representation of symbols for display in the pilot's outside field of vision illustrated in a known manner.

As illustrated in the embodiment shown in FIGS. 1 and 2 in a simplified manner, the display in the field of view 2 of the pilot 4 takes place by means of information in the form of point graduations 40, 41 and in the form of symbols.

The values measured by the measuring devices, in the case of the shown embodiment, by means of the on-board computer 14 in connection which a navigating system, which can be operated by means of a control unit 16, are fed, by way of an operating-mode selector switch 17, to the symbol generator 10. In a known manner, the windshield projection system 1 comprises two basic units, specifically the symbol generator 10 and the display unit 11. For showing the display symbols or display signs generated by the symbol generator 10, a cathode ray tube 20 is connected to the symbol generator 10, on the video screen 21 of which the symbols are displayed.

In a known manner, the display unit 11 of the windshield projection system 1 comprises a deflecting mirror 23 assigned to the video screen 21 of the cathode ray tube 20 and used for the total reflection of the imaging ray S, and another deflecting mirror 24 in the area of the windshield 5 of the airplane 3 or in the exterior field of view 2 of the pilot 4. The deflecting mirror 24 has semi-transmitting characteristics, while the pilot's 4 view to the outside is unimpaired.

A collimator lens system 22 is inserted into the beam path S between the cathode ray tube 20 or its video screen 21 and the deflecting mirrors 23 and 24. By means of this system and by means of the semi-transmitting mirror 24, the imaged display symbols appear to the exterior field of view 2 of the pilot 4 on the video screen 21 superposed infinitely in the same plane so that a constant adaptation of the pilot's eyes to different distances can be avoided.

In the case of the known displays, as shown in FIG. 2 of the drawing, the reference symbol 30 is formed by means of the symbol generator 20 on both sides of the circle 31 by a circle symbol 31 and horizontal bar symbols for displaying the pitching and rolling position. In addition, bar symbols 35 are provided for showing the true horizon or zero pitch line, symbols 36 are provided for showing the roll angle $\phi$ and vertically and horizontally aligned point symbols 40 and 41 are provided for showing the azimuth angle and the angle of incidence.

Figure 3:
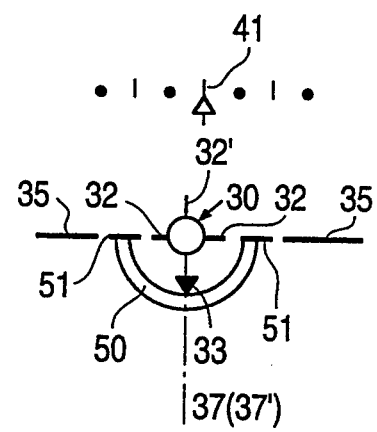
FIG. 3 is a schematic representation of symbols according to the invention for the given normal attitude.
Figure 4:
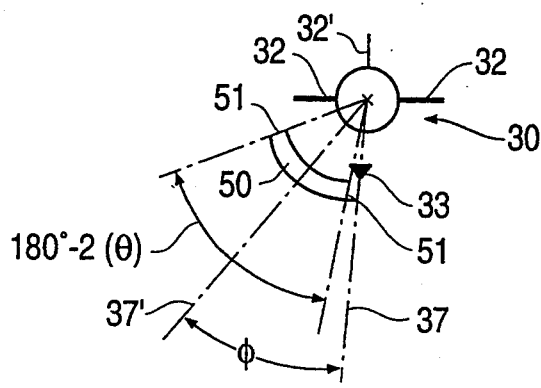
FIG. 4 is a schematic representation of symbols with an attitude which is changed in comparison to the attitude according to FIG. 3 and which displays the rolling angle position and pitching angle position.
Figure 4A:
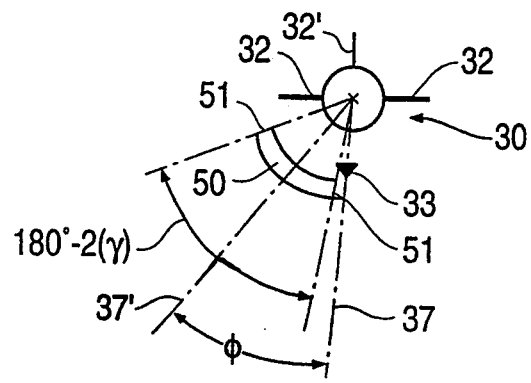
FIG. 4A is a schematic representation similar to FIG. 4 of a display which displays the rolling angle position and flight path angle position.
Figure 5:
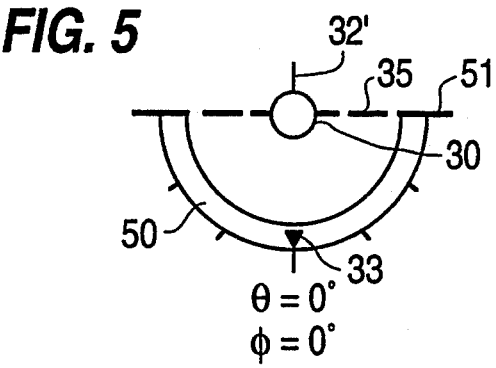
FIGS. 5 to 12 are schematic representations of additional examples of the representation of symbols according to FIG. 3 for attitudes of the aircraft which differ from one another.
Figure 6:
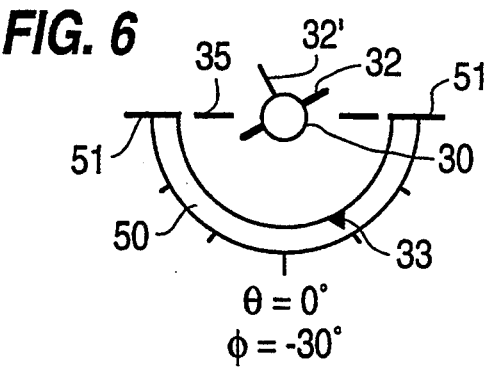
Figure 7:
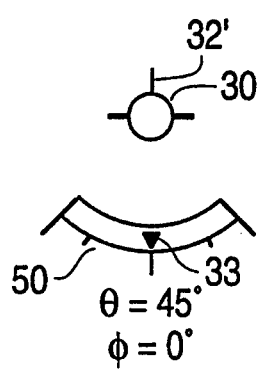
Figure 8:
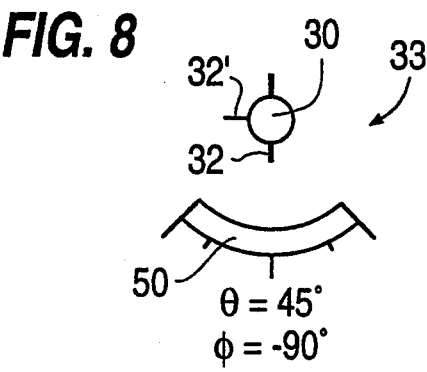
Figure 9:
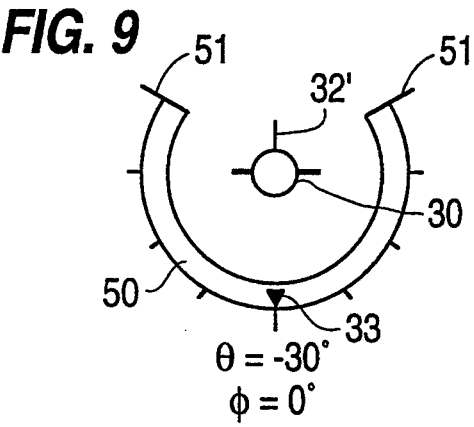
Figure 10:
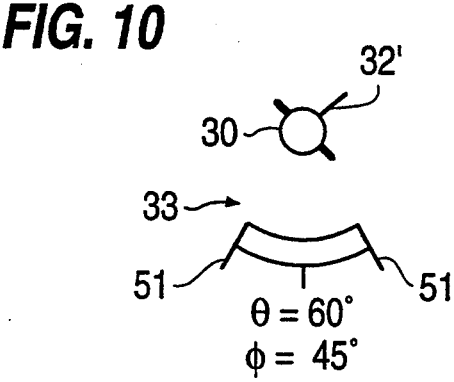
Figure 11:
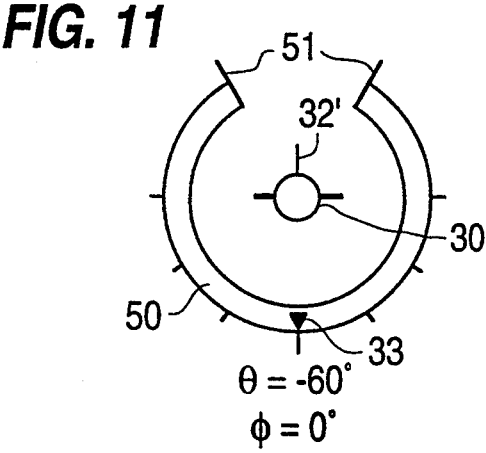
Figure 12:
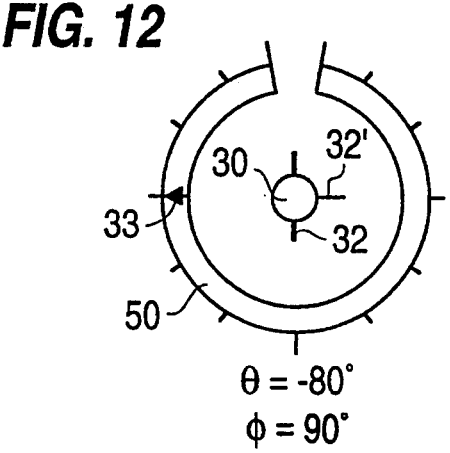

FIGS. 3, 4, and 4A as well as FIGS. 5 to 12 show the display symbol system according to the invention. In the representation according to FIGS. 3 to 12, the same reference numbers are used for the same objects and for the same symbols as in the known representation according to FIG. 2.

Deviating from the known system of symbols according to FIG. 2, the new display symbol system as depicted in FIGS. 3, 4, and 5–12, for indicating the respective pitching angle $\theta$ and rolling angle $\phi$, has an information symbol 50 in the form of a circle sector area or a ring sector area which is coupled to the reference symbol 30. In this case, the arc length (central angle) of the information symbol amounts to 180°−2 times the pitching angle $\theta$. For example, the symbol display for $\theta=-90°$ describes a ring sector area 50=360° and for $\theta=90°$, the ring segment completely. In this case, the rolling position $\phi$ is obtained from the position of the information symbol 50 or its radial center axis 37' with respect to the reference symbol 30 and bar symbol 32', the indicator symbol 33 or the center axis 37. In this case, for example, the information symbol 50 is at $\phi=0°$ below and at $\phi=\pm 180°$ above the reference symbol 30 or the bar symbols 32.

The respective arc length of the information symbol 50 is shown by radial boundary bar symbols 51. The information symbol 50 may, for example, also be formed in the shape of a circle segment or of a ring segment or of an circular arc of a segment in a line display. In this case, the legs of the center angle of the circle sector, corresponding to the attitude with respect to the measured pitching angle $\theta$ form the respective boundaries 51 of the center angle of the circle sector symbol 50.

FIGS. 5 to 12 show examples of the representation of certain attitudes with respect to the respective pitching angle $\theta$ or rolling angle $\phi$ with a corresponding display of the information symbol 50.

FIG. 4A is similar to FIG. 4, except that the rolling angle $\phi$ and flight path angle $\gamma$ are displayed. FIG. 4A represents an alternative display of these angles, rather than the rolling angle $\phi$ and pitching angle $\theta$ of the showing of FIGS. 3, 4, and 5–12. In FIG. 4A, the length of arc 50 corresponds to 180°−2 times $\gamma$.

The described display method permits—even in the case of high pitching speeds—a fast and intuitive grasping of the attitude. The return of the airplane from a position deviating from the predetermined attitude is achieved very rapidly by a positioning of the information system 50 below the reference symbol 30 (rolling angle $\theta=0°$) by corresponding control movements by means of an airplane control element so that the information symbol 50 receives a semicircular shape.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A display system for aircraft for showing the attitude comprising a projection system including devices for displaying symbol features representative of the aircraft position in the exterior view of a pilot, said symbol features including:
   an artificial horizon symbol which is stabilized fixed to the earth for displaying the artificial horizon;
   an airplane symbol which represents the aircraft; and
   an information symbol concentrically surrounding the airplane symbol in the form of a variable circular curve of a circular ring segment;
   wherein the information symbol having an arc length, has a radial center axis, the information symbol changing in size as a function of measured values depending on at least one of the roll angle ($\phi$) with respect to its angular position, the pitch position ($\theta$) relative to the dimension of the circular ring segment, and a flight path angle relative to a course of the aircraft;

wherein the relative position of the airplane and information symbol with respect to one another provide a flight path indication with respect to the pilot's exterior view of the outside world; and wherein the arc length of the information symbol amounts to 180°−2 times the flight path angle.

2. A display system according to claim 1, wherein the display of the information symbol is located at a radial distance from the airplane symbol, and one of a pitching angle symbol ($\theta$) and flight path angle symbol ($\gamma$) is depicted by the segment dimension and the rolling position ($\phi$) and is depicted as an angle change between the airplane symbol or indicator symbol and the information symbol.

3. A display system according to claim 2, wherein the airplane symbol is formed by a circle symbol with laterally connecting bar symbols which cross the airplane symbol in the center, and a vertical bar symbol which is situated on the center axis of the symbol and an indicator symbol provided in the area of the information symbol.

4. A display system according to claim 2, wherein the display of the pitching angle ($\theta$) and of the rolling angle ($\phi$) takes place by the information symbol tied to the airplane symbol.

5. A display system according to claim 1, wherein the airplane symbol is formed by a circle symbol with laterally connecting bar symbols which cross the airplane symbol in the center, and a vertical bar symbol which is situated on the center axis of the symbol and an indicator symbol provided in the area of the information symbol.

6. A display system according to claim 1, wherein the information symbol has a circle sector shape or a ring sector shape with a center axis, which is radial with respect to the airplane symbol, and radial boundary bars with respective equal distances to the center axis.

7. A display system according to claim 1, wherein the information symbol has a circle segment shape or a ring segment shape.

8. A display system according to claim 1, wherein the display of the pitching angle ($\theta$) and of the rolling angle ($\phi$) takes place by the information symbol tied to the airplane symbol.

* * * * *